April 1, 1969   D. N. MICHNOFF   3,435,646
ANTITHEFT DEVICE FOR LOCKING THE BRAKE OF AN AUTOMOTIVE VEHICLE
Filed June 12, 1967
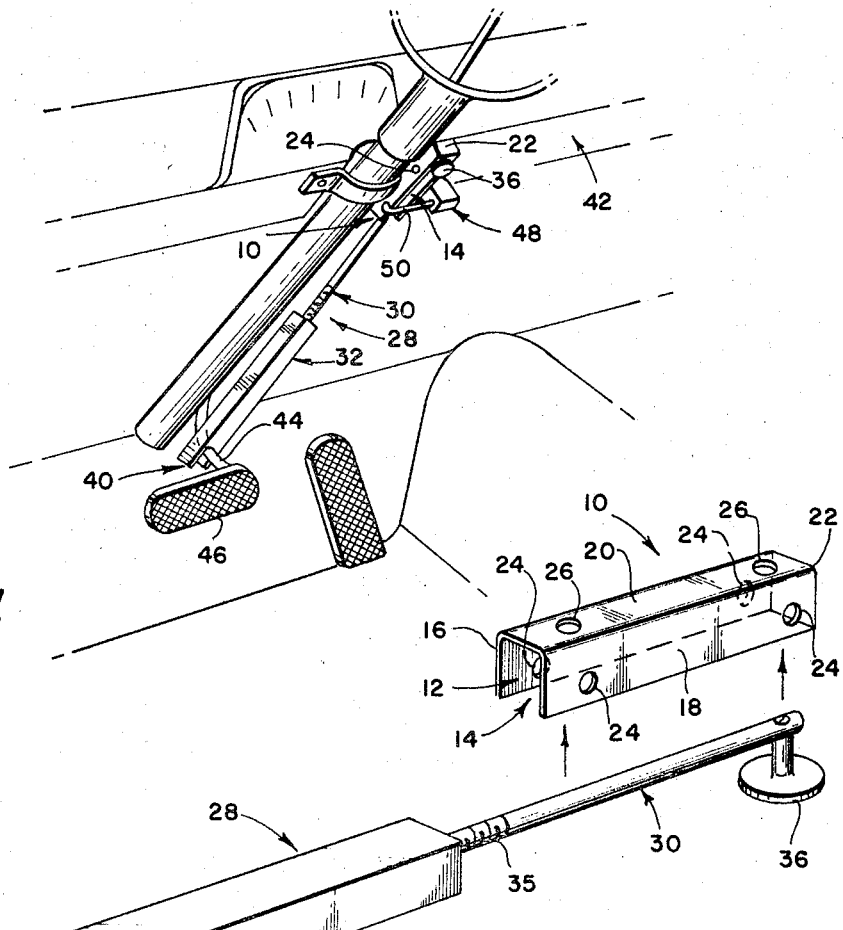
INVENTOR
DAVID N. MICHNOFF
BY 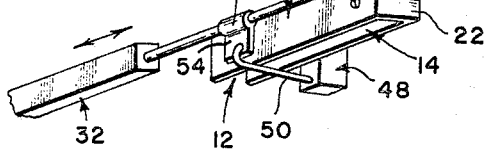
ATTORNEYS

United States Patent Office 3,435,646
Patented Apr. 1, 1969

3,435,646
ANTITHEFT DEVICE FOR LOCKING THE BRAKE OF AN AUTOMOTIVE VEHICLE
David N. Michnoff, 7416 Westpark Drive, Hyattsville, Md. 20783
Filed June 12, 1967, Ser. No. 645,199
Int. Cl. E05b 65/12; G05g 5/06
U.S. Cl. 70—203     6 Claims

ABSTRACT OF THE DISCLOSURE

Locking device for the brake pedal of an automobile, including a receptacle mounted upon the dashboard and an adjustable-length rod having a bifurcated lower end engageable with the brake pedal and an upper end received within the receptacle and held therein by a padlock.

---

This invention relates to an antitheft device for automotive vehicles and more particularly is concerned with a device for locking the brake pedal in a depressed position so that the brakes are applied when the vehicle is unoccupied, thereby to thwart theft attempts.

Incidence of auto thefts has greatly increased in recent years, partially because of the ease of overcoming the ignition lock and because of the absence of other antitheft provisions. It has heretofore been proposed to lock the brakes of an automotive vehicle when the vehicle is unoccupied and thus to prevent unauthorized use, but such proposals have not met with success, because of the expense and complexity of their implementation.

It is a principal object of the present invention, accordingly, to provide a simple and economical device for locking the brake of a vehicle.

Another object of the invention is to provide a device of the foregoing type which may be easily installed in existing automotive vehicles.

A further object of the invention is to provide a device of the foregoing type which is readily adjustable to accommodate different makes and models of automobiles.

An additional object of the invention is to provide a device of the foregoing type which may be readily placed in its operative position and locked and readily rendered inoperative by the authorized driver.

Still another object of the invention is to provide a device of the foregoing type which may remain engaged with the brake pedal, but inoperative, during normal use of the vehicle and which is readily accessible when it is desired to lock the brake.

The foregoing and other objects, advantages, and features of the invention, and the manner in which the same are accomplished will become more readily apparent upon consideration of the following detailed description of the invention taken in conjunction with the accompanying drawings, which illustrate a preferred and exemplary embodiment, and wherein:

FIGURE 1 is a perspective view illustrating the installation and use of the invention;

FIGURE 2 is a perspective exploded view illustrating principal parts of the invention;

FIGURE 3 is a longitudinal sectional view of a principal part of the invention; and FIGURE 4 is a fragmentary perspective view illustrating the placement of the parts when the authorized driver desires to use the vehicle.

Referring to the drawings, and initially to FIGURE 2 thereof, the apparatus of the invention comprises a receptacle 10, preferably a rectangular steel box open at one end 12 (which may be termed the bottom), and open at one side 14 (which may be termed the rear). The other sides 16, 18 and 20 (the latter being termed the front) and the other end 22 (which may be termed the top) are closed. The sides 16 and 18 are provided with pairs of aligned apertures 24, and the front 20 is provided with a pair of apertures 26 for purposes which will appear hereinafter.

In association with the receptacle 10 is a rod 28, preferably of steel, which has an upper portion 30 and a lower portion 32. In the form shown the cross-section of the upper portion 30 is circular, while that of the lower portion 32 is rectangular, the lower portion being hollow and being provided with spaced nuts 34 (see FIGURE 3) fixed therein for receiving the corresponding lower section of the upper rod portion 30, which is externally threaded as shown at 35. Although the entire upper portion 30 may be threaded it is preferred that the upper section of this portion of the rod be smooth as shown. One end of the rod (which will be termed the upper extremity) is provided with a handle or knob 36, while the other end of the rod (which may be termed the lower extremity) is bifurcated, the bifurcations 38 being extensions of the side walls of the lower portion 32 and providing therebetween a space 40.

To install the device of the invention, the receptacle 10 is mounted upon the vehicle at an appropriate location above the brake pedal, preferably upon the inclined lower portion of or adjacent to the dashboard 42, as shown in FIGURE 1, with the open side 14 facing rearwardly and the open end 12 facing downwardly. Holes 26 on the front side 20 of the receptacle may receive suitable sheet metal screws or bolts (not shown) for attaching the receptacle to the dashboard or other appropriate vehicle member.

The rod 28 is then adjusted in length by threading the upper portion 30 into or out of the lower portion 32, so that when the bifurcated extremity is placed over the suspending lever 44 of the brake pedal 46 of the vehicle (the space 40 being predetermined accordingly) and the upper extremity of the rod is inserted into the appropriately dimensioned receptacle 10, as shown in FIGURE 1, with the upper tip of the rod engaging the closed top 22 of the receptacle and the knob 36 exposed, the brake pedal 46 will be held depressed so as to apply the brakes of the vehicle. If the brake lights are not wired through the ignition switch, so that they are deenergized when the ignition is off, they may be so wired by a simple wiring modification.

A padlock 48 is then employed to retain the rod 28 in position, the shackle 50 of the lock being inserted through one of the pairs of aligned openings 24, so that when the lock is closed the shackle will block egress of the rod through the rear of the receptacle and prevent the rod from being withdrawn. The receptacle fits the upper extremity of the rod closely enough to ensure that, considering the length and spacing of the bifurcations, the rod cannot be removed from the brake pedal by tipping the rod to the side. The pedal itself prevents removal by rearward movement of the bifurcations, and the upward inclination of the pedal supporting lever prevents removal by forward movement. Thus, both lateral and longitudinal movement of the rod are prevented. It is impossible to operate the vehicle without first opening the padlock and releasing the rod from the receptacle.

While the rod may be removed from the brake pedal entirely when the authorized occupant desires to operate the vehicle, it is convenient to leave the rod engaged with the brake pedal and yet to permit the brake pedal to move up and down in the normal manner. This may be accomplished as illustrated in FIGURE 4, for example, by means of a sleeve 52, through which the upper portion 30 of the rod passes freely. The sleeve has an arm 54 which may be affixed to the receptacle 10 by means of the shackle 50 of the lock 48, arm 54 being provided with a suitable aperture alignable with one of the apertures 24 of the receptacle. When the rod is removed from the receptacle and positioned as shown in FIGURE 4, the lower end may remain upon the brake pedal and the upper portion may nevertheless move up and down within the sleeve 52 to permit the brake pedal to be operated. Sleeve 52 may remain upon the rod at all times, being separable from the receptacle 10 when the lock 48 is removed. The smooth surface of the top section of the upper portion 30 of the rod permits silent movement of the rod relative to the sleeve. If desired, the lower extremity of the rod may be engaged with an abutment secured to the brake pedal lever 44 higher up than as shown in FIGURE 1, to avoid any interference with the foot of the operator. Such an abutment may be a simple C-clamp secured to lever 44, for example.

It is thus apparent that the device of the invention provides a simple structure for locking the brake of an automotive vehicle and preventing unauthorized use. While devices, such as that described in U.S. Patent No. 1,596,834 to Herbert et al., have been proposed heretofore for holding a brake pedal in position to permit adjustment of the brakes, such devices have not been constructed to permit ease of locking, so as to prevent unauthorized use of the vehicle, nor to permit convenient use and location of the device when not in use.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative rather than restrictive of the invention.

The invention claimed is:

1. A device for depressing and locking the brake pedal of an automotive vehicle comprising, in combination, a receptacle, a rod readily separable from said receptacle and having an upper extremity adapted for reception within said receptacle with the rod extending downwardly therefrom and the lower extremity adapted to engage and hold the brake pedal depressed, said receptacle having means for mounting the same upon the vehicle adjacent to the dashboard and above said brake pedal, and lock means for engaging said receptacle and retaining the upper extremity of said rod therein with the lower extremity engaging and depressing said brake pedal, said receptacle being a substanitally rectangular box open only at the bottom and at one side thereof.

2. The device of claim 1, said lock means comprising a padlock and said receptacle having aperture means for receiving the shackle of said padlock in order to block the egress of the upper extremity of said rod through said open side of said receptacle.

3. The device of claim 1, the upper extremity of said rod having a laterally projecting handle thereon whereby the rod may be grasped and readily withdrawn from said receptacle when the lock means is removed.

4. The device of claim 1, said rod having a hollow lower portion and an upper portion threaded into said lower portion, the lower extremity of said lower portion being bifurcated with the bifurcations space dapart to permit the lower extremity of the rod to be placed over the supporting lever of the brake pedal.

5. The device of claim 4, said bifurcations being extensions of the side walls of said lower portion.

6. A device for depressing and locking the brake pedal of an automotive vehicle comprising, in combination, a receptacle, a rod having an upper extremity adapted for reception within said receptacle and a lower extremity adapted to engage the brake pedal, said receptacle having means for mounting the same upon the vehicle adjacent to the dashboard, and lock means for engaging said receptacle and retaining the upper extremity of said rod therein, said receptacle having a sleeve adapted to be fixed thereto for receiving an upper portion of said rod with free longitudinal movement, said lock means comprising a padlock, said sleeve having an aperture for receiving the shackle of said padlock for mounting said sleeve upon said receptacle when said rod is not in said receptacle.

References Cited

UNITED STATES PATENTS

| | | | |
|---|---|---|---|
| 1,250,711 | 12/1917 | Taylor | 70—202 |
| 1,333,093 | 3/1920 | Pierce | 70—203 |
| 1,533,736 | 4/1925 | Humphrey et al. | 70—201 |
| 1,764,383 | 6/1930 | Bezek | 70—202 |
| 2,103,089 | 12/1937 | Pichucki | 70—202 |
| 3,190,090 | 6/1965 | Zaidener | 70—203 |

MARVIN A. CHAMPION, *Primary Examiner.*

ROBERT L. WOLFE, *Assistant Examiner.*